US011658883B2

(12) United States Patent
Moore et al.

(10) Patent No.: US 11,658,883 B2
(45) Date of Patent: *May 23, 2023

(54) SYSTEM AND METHOD FOR MANAGING CONTENT ITEMS FOR SHARING ACROSS MULTIPLE SITES

(71) Applicant: Open Text SA ULC, Halifax (CA)

(72) Inventors: Robert K. Moore, Austin, TX (US); Robert S. Dickerson, Atlanta, GA (US); Jeffrey M. Collins, Austin, TX (US)

(73) Assignee: OPEN TEXT SA ULC, Halifax (CA)

(*) Notice: Subject to any disclaimer, the term of this patent is extended or adjusted under 35 U.S.C. 154(b) by 0 days.

This patent is subject to a terminal disclaimer.

(21) Appl. No.: 15/664,837

(22) Filed: Jul. 31, 2017

(65) Prior Publication Data

US 2017/0331702 A1 Nov. 16, 2017

Related U.S. Application Data

(63) Continuation of application No. 14/310,976, filed on Jun. 20, 2014, now Pat. No. 9,755,915, which is a continuation of application No. 10/681,710, filed on Oct. 8, 2003, now Pat. No. 8,805,878.

(51) Int. Cl.
*H04L 41/00* (2022.01)
*H04L 41/50* (2022.01)
*G06F 16/958* (2019.01)

(52) U.S. Cl.
CPC ............ *H04L 41/50* (2013.01); *G06F 16/958* (2019.01)

(58) Field of Classification Search
CPC combination set(s) only.
See application file for complete search history.

(56) References Cited

U.S. PATENT DOCUMENTS

| | | | |
|---|---|---|---|
| 5,983,227 A | 11/1999 | Nazem et al. | |
| 6,185,587 B1 | 2/2001 | Bernardo et al. | |
| 6,185,591 B1* | 2/2001 | Baker | G06F 40/166 715/210 |
| 6,463,460 B1* | 10/2002 | Simonoff | G06F 3/033 709/205 |
| 6,529,910 B1 | 3/2003 | Fleskes | |
| 6,557,013 B1* | 4/2003 | Ziff | G06Q 10/10 707/913 |

(Continued)

OTHER PUBLICATIONS

Using Paradox 5 for Windows special edition, QUE, 1994, pp. 326-331, and 525-537.

(Continued)

*Primary Examiner* — Farhan M Syed
(74) *Attorney, Agent, or Firm* — Sprinkle IP Law Group (57) ABSTRACT

Systems and methods for managing content items of the type used in Web sites. In accordance with the disclosure, site objects, channel objects and content objects are associated with each other to form a hierarchical site structure. The content objects are linked to corresponding content items in a content repository, and are grouped together by association with channel objects in the site structure. Each of the objects in the site structure has an associated set of content services and can be deployed individually or in combination, while maintaining references to the related objects in the hierarchical site structure.

20 Claims, 7 Drawing Sheets

(56) References Cited

U.S. PATENT DOCUMENTS

| | | | |
|---|---|---|---|
| 6,601,057 B1* | 7/2003 | Underwood | G06F 40/10 707/999.001 |
| 6,697,825 B1* | 2/2004 | Underwood | G06F 16/958 707/E17.116 |
| 6,704,743 B1 | 3/2004 | Martin | |
| 6,857,012 B2* | 2/2005 | Sim | H04L 67/1034 709/221 |
| 6,873,995 B2* | 3/2005 | Benson | G06F 16/252 707/684 |
| 6,874,001 B2* | 3/2005 | Narang | G06F 16/90 707/999.203 |
| 6,904,454 B2* | 6/2005 | Stickler | G11B 27/32 715/255 |
| 6,983,288 B1* | 1/2006 | Kirkwood | G06F 16/289 |
| 7,013,313 B1 | 3/2006 | LaRue | |
| 7,130,885 B2* | 10/2006 | Chandra | G06Q 10/107 709/224 |
| 7,133,845 B1* | 11/2006 | Ginter | G06Q 20/02 705/52 |
| 7,152,207 B1* | 12/2006 | Underwood | G06F 16/958 715/788 |
| 7,167,903 B2 | 1/2007 | Percival | |
| 7,325,193 B2 | 1/2008 | Edd et al. | |
| 7,475,346 B1 | 1/2009 | Bullock et al. | |
| 7,660,902 B2* | 2/2010 | Graham | H04L 67/02 709/219 |
| 7,668,913 B1* | 2/2010 | Underwood | G06Q 30/0601 715/236 |
| 7,779,352 B1* | 8/2010 | Underwood | H04L 51/046 715/250 |
| 7,844,835 B2* | 11/2010 | Ginter | G06Q 20/04 713/192 |
| 7,865,819 B2 | 1/2011 | Wilson | |
| 7,886,221 B1* | 2/2011 | Underwood | H04L 51/046 715/255 |
| 7,904,799 B1* | 3/2011 | Underwood | G06Q 30/0601 709/219 |
| 7,904,804 B1 | 3/2011 | Wilson | |
| 7,917,749 B2* | 3/2011 | Ginter | H04N 21/2547 713/168 |
| 8,136,027 B2* | 3/2012 | Underwood | G06F 16/958 715/204 |
| 8,407,353 B2 | 3/2013 | Moses | |
| 8,533,851 B2* | 9/2013 | Ginter | H04L 63/04 713/193 |
| 8,543,842 B2* | 9/2013 | Ginter | G06Q 20/12 380/225 |
| 8,671,339 B2 | 3/2014 | Wilson et al. | |
| 8,805,878 B2 | 8/2014 | Moore et al. | |
| 9,516,073 B2 | 12/2016 | Wilson et al. | |
| 9,755,915 B2 | 9/2017 | Moore et al. | |
| 2001/0011265 A1 | 8/2001 | Cuan et al. | |
| 2001/0044834 A1 | 11/2001 | Bradshaw et al. | |
| 2002/0078140 A1 | 6/2002 | Kelly et al. | |
| 2002/0103933 A1 | 8/2002 | Garon et al. | |
| 2002/0138582 A1* | 9/2002 | Chandra | G06Q 10/107 709/206 |
| 2002/0156702 A1* | 10/2002 | Kane | G06Q 30/0641 705/27.1 |
| 2002/0165944 A1 | 11/2002 | Wisner et al. | |
| 2002/0178271 A1* | 11/2002 | Graham | H04L 63/101 709/229 |
| 2003/0005409 A1 | 1/2003 | Tumati | |
| 2003/0014483 A1* | 1/2003 | Stevenson | H04L 29/06 709/203 |
| 2003/0051164 A1* | 3/2003 | Patton | G06F 21/33 726/4 |
| 2003/0056025 A1 | 3/2003 | Moses et al. | |
| 2003/0195885 A1* | 10/2003 | Emmick | G06F 16/86 |
| 2004/0199867 A1* | 10/2004 | Brandenborg | G06Q 10/06 715/201 |
| 2005/0125431 A1* | 6/2005 | Emmick | G06F 16/86 |
| 2006/0041580 A1 | 2/2006 | Ozdemir et al. | |
| 2006/0200751 A1* | 9/2006 | Underwood | G06F 16/958 715/255 |
| 2008/0109472 A1* | 5/2008 | Underwood | G06Q 10/10 707/999.102 |
| 2010/0205551 A1* | 8/2010 | Underwood | G06Q 30/0601 715/760 |
| 2010/0306644 A1* | 12/2010 | Underwood | G06Q 30/0601 715/234 |
| 2014/0181280 A1 | 6/2014 | Collins et al. | |

OTHER PUBLICATIONS

Yahoo! Mail-Online Support, help pgs., Archive.org, 2000, 23 pgs.
Office Action for U.S. Appl. No. 09/989,814, dated Oct. 5, 2004, 11 pgs.
Office Action for U.S. Appl. No. 09/989,814, dated May 18, 2005, 11 pgs.
Office Action for U.S. Appl. No. 09/989,814, dated Sep. 26, 2005, 15 pgs.
MyYahoo.com Help Pgs., Archive.org, 1999, 19 pgs.
Office Action for U.S. Appl. No. 09/989,814, dated Mar. 15, 2006, 15 pgs.
Office Action for U.S. Appl. No. 11/212,937, dated Jun. 16, 2006, 10 pgs.
Office Action for U.S. Appl. No. 09/989,814, dated Sep. 15, 2006, 15 pgs.
Office Action for U.S. Appl. No. 11/212,937, dated Dec. 5, 2006, 12 pgs.
Examiner's Answer to Appeal Brief for U.S. Appl. No. 09/989,814, mailed Aug. 24, 2007, 17 pgs.
Examiner's Answer to Appeal Brief for U.S. Appl. No. 11/212,937, mailed Oct. 16, 2007, 13 pgs.
Decision on Appeal for U.S. Appl. No. 09/989,814, mailed Jan. 30, 2009, 26 pgs.
Office Action for U.S. Appl. No. 09/989,814, dated Jun. 3, 2009, 16 pgs.
Web Characterization Terminology & Definitions Sheet, W3C Working Draft, dated May 24, 1999, 10 pgs., downloaded from the Internet on Feb. 12, 2010 at http://www.w3.org/TR/.
Yahoo! Home Page, and Source Code for Yahoo! Home Page dated Jan. 1999, 5 pgs. downloaded from the Internet on Feb. 24, 2010.
My Yahoo! Front Page, and Source Code for My Yahoo! Front Page, dated Jan. 1999, 12 pgs. downloaded from the Internet on Feb. 24, 2010 at http://web.archive.org/web/19990125091014/my.yahoo.com/.
Decision on Appeal for U.S. Appl. No. 11/212,937, mailed Feb. 2, 2010, 12 pgs.
Office Action for U.S. Appl. No. 09/989,814, dated Dec. 4, 2009, 18 pgs.
Dunigan, et al., "Managing Resources," MCSC Training Guide: Windows NT Workstation 4.0, 1997, Ch. 3, pp. 141-192, New Riders Publishing, Indianapolis, IN.
Office Action for U.S. Appl. No. 09/989,814, dated Apr. 13, 2010, 20 pgs.
Office Action for U.S. Appl. No. 11/212,937, dated Apr. 12, 2010, 12 pgs.
Office Action for U.S. Appl. No. 10/681,710, dated Mar. 30, 2006, 11 pgs.
Surjanto et al., XML Content Management based on Object-Relational Database Technology, IEEE, May 2000, pp. 70-79.
Office Action for U.S. Appl. No. 10/681,710, dated Aug. 16, 2006, 11 pgs.
Appeal Brief for U.S. Appl. No. 10/681,710, filed May 22, 2007, 31 pgs.
Examiner's Answer for U.S. Appl. No. 10/681,710, dated Sep. 25, 2007, 14 pgs.
Reply Brief for U.S. Appl. No. 10/681,710, filed Nov. 6, 2007, 18 pgs.
Decision for U.S. Appl. No. 10/681,710, mailed Jun. 21, 2012, 29 pgs.
Office Action for U.S. Appl. No. 12/986,965, dated Aug. 16, 2012, 12 pgs.

(56) References Cited

OTHER PUBLICATIONS

Office Action for U.S. Appl. No. 10/681,710, dated Dec. 5, 2012, 9 pgs.
Office Action for U.S. Appl. No. 12/986,965, dated Mar. 14, 2013, 18 pgs.
Office Action for U.S. Appl. No. 10/681,710, dated Jun. 24, 2013, 12 pgs.
Office Action for U.S. Appl. No. 10/681,710, dated Oct. 22, 2013, 13 pgs.
Office Action issued for U.S. Appl. No. 14/310,976, dated Sep. 8, 2015, 15 pages.
Office Action issued for U.S. Appl. No. 14/144,057, dated Mar. 8, 2016, 12 pages.
Office Action issued for U.S. Appl. No. 14/310,976, dated Mar. 22, 2016, 19 pages.
Office Action for U.S. Appl. No. 14/144,057, dated May 11, 2016, 12 pgs.
Office Action for U.S. Appl. No. 14/310,976, dated Aug. 4, 2016, 17 pgs.
Office Action for U.S. Appl. No. 14/310,976, dated Jan. 23, 2017, 19 pgs.

* cited by examiner

PRIOR ART

SYSTEM AND METHOD FOR MANAGING CONTENT ITEMS FOR SHARING ACROSS MULTIPLE SITES

CROSS-REFERENCE TO RELATED APPLICATIONS

This application is a continuation of and claims a benefit of priority under 35 U.S.C. 120 of the filing date of U.S. patent application Ser. No. 14/310,976, filed Jun. 20, 2014, now U.S. Pat. No. 9,755,915, entitled "SYSTEM AND METHOD FOR MANAGING CONTENT ITEMS FOR SHARING ACROSS MULTIPLE SITES", which is a continuation of and claims a benefit of priority under 35 U.S.C. 120 of the filing date of U.S. patent application Ser. No. 10/681,710, filed Oct. 8, 2003, now U.S. Pat. No. 8,805,878, entitled "SITE AND CHANNEL MANAGEMENT TO ACHIEVE CONTENT REPURPOSING," which are fully incorporated by reference herein for all purposes.

FIELD OF THE INVENTION

The invention relates generally to content management systems for Web sites and more particularly to systems and methods for enabling information relating to content organization and services to be deployed from an enterprise level content management system to different end-user facing platforms.

RELATED ART

Internet sites (or Web sites) consist of a set of pages containing the content of the site. The pages consist of content items such as articles, graphics and the like, arranged in a viewable display. While the management of the content items is transparent to the end-user, it is important to be able to manage the content of the Web sites in a manner which is efficient and which allows the needs of the individual sites to be met.

Generally speaking, it is desirable for the content of a web site (the "content") to have a resting home. In other words, there should be a location in which it permanently resides. Typically, there are large numbers of content items that are available to a site, so it is convenient to maintain the content in the form of a file system. This file system organizes the site's content repository, which is simply the collection of all of the content that is available to the site. Copies of the content repository, which are essentially snapshots of the content repository at a given time, can then be deployed to the platforms that support Web sites that use the included content.

The content repository is typically where the content of the site is managed. For example, security, access control and workflow normally take place at the level of the content repository rather than at the level of the site itself. These functions are performed by a content management system that operates on the items in the content repository.

Content management systems are of particular importance in situations in which an enterprise owns or operates multiple Web sites. In this case, individual content items often have to be deployed to more than one place. In other words, these content items may be used by many different Web sites, which themselves may be supported by many different hardware and software configurations.

Figure 1:
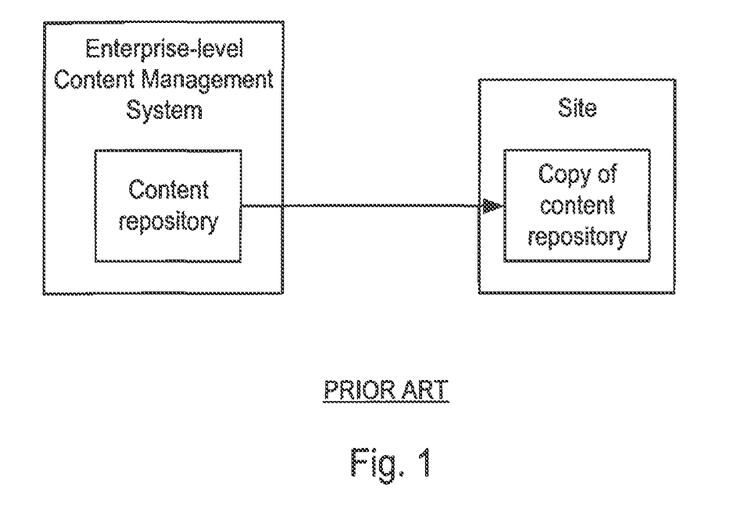
FIG. 1 is a diagram illustrating the deployment of content in the prior art by copying a content repository in its entirety to a site.

The task of coordinating the shared use of these content items among these different hardware/software configurations is a daunting one. The difficulty arises, at least in part, as a result of several problems. For example, content items residing in any content repository are normally deployed to a site by providing a copy of the content repository to the site, as shown in FIG. 1. This copy is, as indicated above, a snapshot of the content repository. If changes are made to the repository itself, the previously deployed copies are no longer current. In order to make the sites' copies current, new copies must be deployed, and his incremental changes to the copies of the repository cannot be made. This can consume large amounts of resources. Another problem is that existing systems do not provide versioning functionality. Without this capability, sites' copies of the repository may not include current versions of content items, or they may include versions that are obsolete, unauthorized, or are similarly flawed.

SUMMARY OF THE INVENTION

One or more of the problems outlined above may be solved by the various embodiments of the invention. Broadly speaking, the invention comprises systems and methods for managing content items of the type used in Web sites. In accordance with the disclosure, site objects, channel objects and content objects are associated with each other to form a hierarchical site structure. The content objects are linked to corresponding content items in a content repository, and are grouped together by association with channel objects in the site structure. Each of the objects in the site structure has an associated set of content services and can be deployed individually or in combination, while maintaining references to the related objects in the hierarchical site structure.

One embodiment is an enterprise-level content management system that is configured to maintain one or more site structures, wherein the site structures comprise a group of interrelated site objects, channel objects and content objects, each of which has an associated set of content services. The use of references between the site, channel and content objects in this content management application provides sufficient information to the endpoints (which support the sites) to enable the replacement of specific content with newly received content. Incremental updates of the sites are therefore possible.

Another embodiment of the invention may comprise an architecture for managing internet content. The architecture comprises a set of objects, including content objects that correspond to content items in a content repository and channel objects, wherein references between the channel and content objects define the interrelationship between them. Site objects are also defined and are associated with the channels via references between them. The references between the channel and content objects may be "owned" by either the channel objects or the content objects. The references between the site and channel objects may be "owned" by either the site objects or the channel objects. In both cases, the references should preferably all be owned by one type of object or another. The references are maintained when the objects are deployed, so that the hardware for the receiving site can determine where the objects belong in the structure of the site and can make incremental changes to the site.

In one embodiment, the objects of the architecture are instantiated from classes which inherit the same set of content services from a parent class. These content services may comprise versioning, restoring, deploying, workflow, approval, authorization, archiving, reporting, and so on. Because the site and channel classes inherit the same services as the content class, the site and channel objects can be handled in the same manner as the content objects.

Another embodiment of the invention may be a method. One method comprises providing a content repository having a plurality of content items, creating a plurality of abstract content objects, each having an associated set of content services, and linking each of the content objects to a corresponding one of the content items. Then, the content items can be managed using the content services associated with each of them.

Another method comprises providing one or more content objects and one or more channel objects, wherein the content objects are linked to corresponding content items in a content repository, and creating references between the channel objects and content objects. The content can then be managed not only at the content object level, but also at the channel level. The channel objects can be used, for example, to categorize content objects, to organize content objects, as handles for groups of content objects. If the channel objects have the same content services as the content objects associated with them, they can be handled in the same manner as the content objects.

Another method comprises providing one or more content objects and one or more channel objects, wherein the content objects are linked to corresponding content items in a content repository, creating references between the channel objects and content objects, and deploying one or more of the channel and/or content objects to an endpoint. The references between the channel and content objects may be owned by either the channel objects or the content objects. The reference data is deployed with the objects and provides sufficient information to enable the replacement of obsolete versions of the objects with the newer versions of the objects (i.e., incremental updating of the content at the endpoint).

Another embodiment of the invention may be a software application. The software application includes instructions for causing a computer or other data processor to perform the methods disclosed herein. These software applications may be embodied in any medium readable by such a computer or data processor, including floppy disks, magnetic tapes, CD-ROMs, DVD-ROMs, RAM, ROM, and the like. Likewise, a computer or data processor which is configured to execute such software applications, or which is otherwise programmed to perform the methods disclosed herein is intended to be covered by the present application. It should be noted that the methodologies disclosed herein may also be implemented in various combinations of software (including firmware) and hardware. The present application is intended to cover such combinations.

Numerous additional embodiments are also possible.

The various embodiments of the invention may provide a number of advantages over the prior art. For example, they may facilitate management of content by associating content services with not only the content objects that are linked to the content items in the content repository, but also with the channel objects and site objects. When the content objects are grouped into channels and/or sites, they can be conveniently handled as a group (since the sites/channels have the same content services and can be handled in the same manner as the content objects themselves). This leads to another of the advantages, which is that the content objects and/or channels objects and/or site objects can be incrementally deployed. That is, they can be deployed individually or in groups that comprise less than the entire content repository. They may therefore be more readily and more efficiently transmitted to the site endpoints. Still other advantages may also be obtained under the disclosed systems and methods.

BRIEF DESCRIPTION OF THE DRAWINGS

Other objects and advantages of the invention may become apparent upon reading the following detailed description and upon reference to the accompanying drawings.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the invention as defined by the appended claims.

DETAILED DESCRIPTION OF A PREFERRED EMBODIMENT

A preferred embodiment of the invention is described below. It should be noted that this and any other embodiments described below are exemplary and are intended to be illustrative of the invention rather than limiting.

Broadly speaking, the invention comprises systems and methods for managing content items of the type used in Web sites. In accordance with the disclosure, site objects, channel objects and content objects are associated with each other to form a hierarchical site structure. The content objects are linked to corresponding content items in a content repository, and are grouped together by association with channel objects in the site structure. Each of the objects in the site structure has an associated set of content services and can be deployed individually or in combination, while maintaining references to the related objects in the hierarchical site structure.

One embodiment of the invention comprises a content management system in which hierarchical site structures are defined. Rather than simply managing the content items contained in a content repository, the content management system identifies sites, channels associated with the sites, and sub-channels and content items associated with the channels. In this system, sites are abstract objects that are created for the purpose of targeting content items. Channels are subdivisions of the sites and are likewise attract objects that are used to target content items. The channels contain shortcuts (links) to the content items in the content repository. The sites, channels sub channels and content item shortcuts are handled as database objects that contain references to the objects (other sites, channels sub channels and content item shortcuts) with which they are associated. Because the individual objects include this reference information, they can be deployed to endpoints (web site platforms), which can then identify and replace the corresponding obsolete objects in their copies of the content repository with the received objects.

Before describing the preferred embodiment in detail, it will be helpful to define the following terms as they are used below. A "site" is an abstract object which represents a domain name and the hardware serving it. In the context of the invention, a site is purely a targeting mechanism which defines a destination into which content items from the content repository will be shared. A "channel" is a subdivision of a site. This provides a mechanism for grouping content items and for providing targeting on a finer granularity than the site. A "content item" is an item stored in the content repository. The content item has associated content services such as versioning, restoring, deploying, workflow, approval, authorization, archiving, reporting, categorizing and business process modeling. Although site structures within the content management system actually contain shortcuts to the content items, these shortcuts will simply be referred to in the context of the site structure as content items for the sake of brevity.

Figure 2:
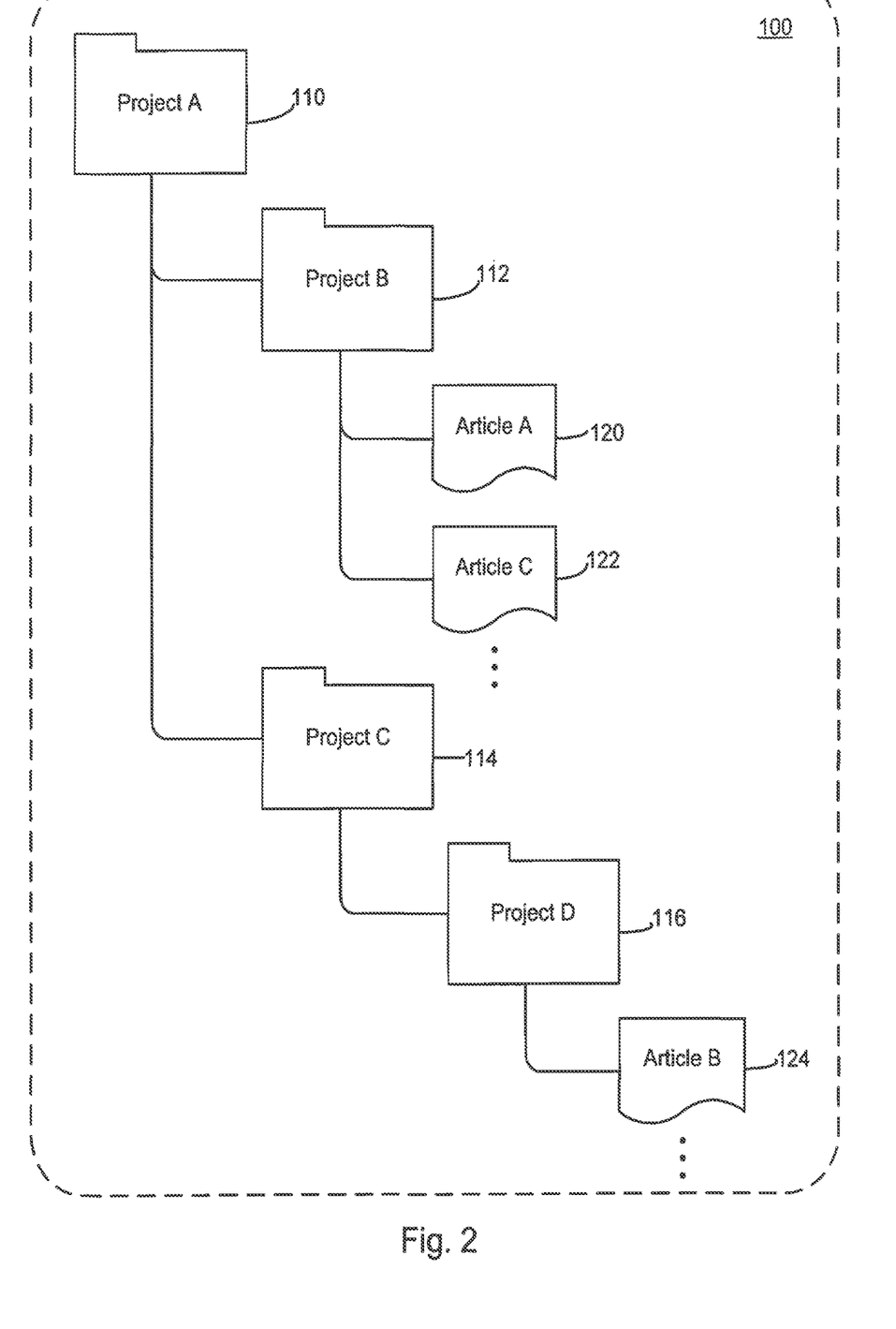
FIG. 2 is a diagram illustrating a file system structure for a content repository in accordance with one embodiment of the invention.

As mentioned above, content items reside in a content repository. Referring to FIG. 2, a diagram illustrating a file system structure for a content repository in accordance with one embodiment of the invention is shown. In this figure, the content repository is designated generally by the reference number 100. Content repository 100 comprises a top-level folder or directory 110, as well as a number of subfolders 112, 114, 116 and a number of content items 120, 122, 124. The folders and content items may be named in any appropriate manner. In this instance, the folders are identified as projects, while the content items are identified as articles. The folders may contain subfolders and/or content items. The content items obviously do not contain any other content items or folders.

The content repository is not only a place to store the content used by the enterprise, but also a place to manage the content. Managing the content in an enterprise environment involves controlling the manner in which the content is shared among the internet properties in the enterprise. Management of the content includes managing security, access control and workflow for the content. These functions are implemented via a content management application.

While the content repository is a convenient place to manage security, workflow, access control, etc. for the enterprise's internet content, it is not necessarily a good place to organize or categorize the content. One of the reasons for this is that the content may be shared by a number of sites, each of which might have its own preferred organization. It may therefore be useful to add another level of structure for this purpose. The system enables this additional layer of structure through the use of site structures.

Figure 3:
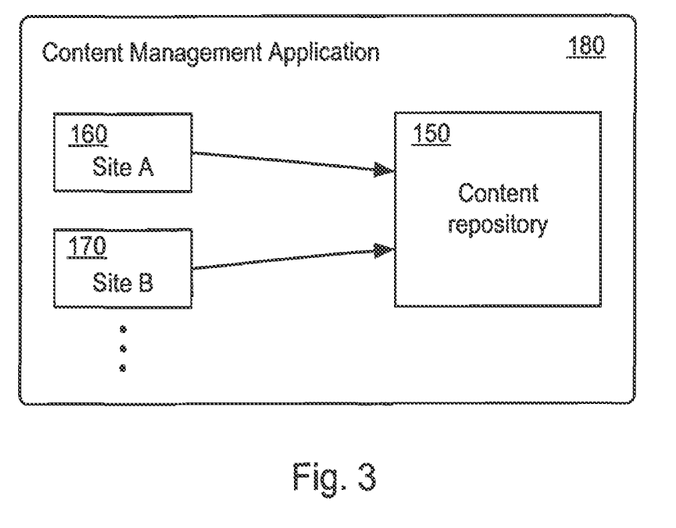
FIG. 3 is a diagram illustrating the relationship between the site structures and the content repository in one embodiment.

Referring to FIG. 3, a diagram illustrating the relationship between the site structures and the content repository in one embodiment is shown. As noted above, the site structures provide a level of abstraction from the content repository. The site structures include content objects that are linked to content items in the content repository as indicated by the arrows from site structures 160 and 170 to content repository 150. The content objects are grouped together in channels within the site. The channels are represented by channel objects. Content objects and channel objects are organized under site objects, which represent the different sites of the enterprise for which the content repository is maintained. The site structures, including the channel and content objects contained therein, as well as the content repository are manipulated using a content management application 180.

Figure 4:
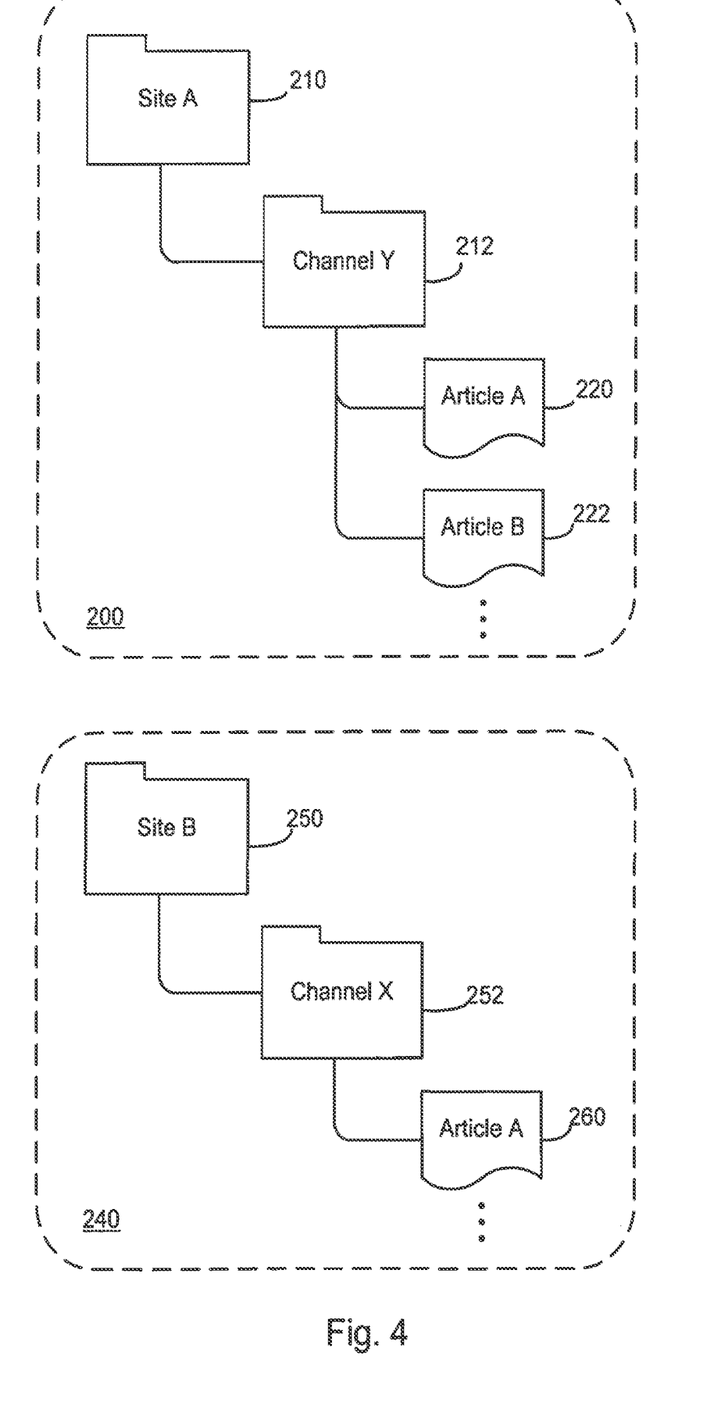
FIG. 4 is a diagram illustrating two hierarchical site structures in accordance with one embodiment of the invention.

Referring to FIG. 4, a diagram illustrating two hierarchical site structures in accordance with one embodiment of the invention is shown. In site structure 200, the top level of the hierarchy is Site A, indicated by reference number 210. Below Site A (210) is Channel Y (212). Channel Y (212) contains a plurality of content items, including Articles A and B (220 and 222, respectively). The second site structure, indicated generally by reference number 240, has Site B (250) at the top of its hierarchy. Below Site B (250) is Channel X (252), which contains a series of content items, including Article A (260).

Figure 5:
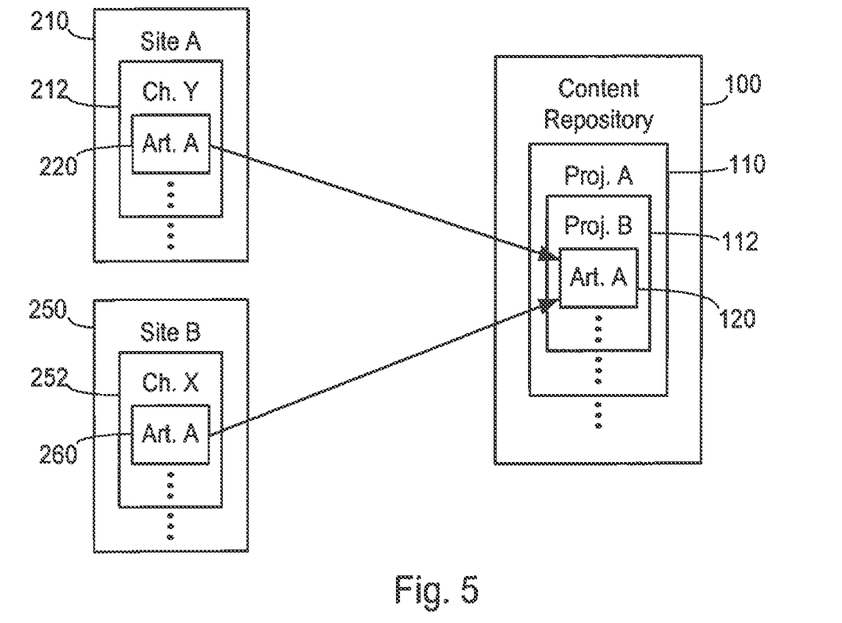
FIG. 5 is a diagram illustrating the relationship between the objects defined in the site structure and the content items contained in the content repository in the embodiment of FIG. 4.

Referring to FIG. 5, a diagram illustrating the relationship between the objects defined in the site structure and the content items contained in the content repository. Sites 210 and 250 and their respective channels provide a means to organize content objects. In this example, each site has a content object (220 and 260) representing Article A. Each of these content objects is linked to the actual content item which is Article A in the content repository 100.

It can be seen from FIGS. 4 and 5 that the different site structures can share the same content simply by including content objects that reference the same content items (e.g., Article A). The content can then be organized in whatever manner is appropriate for each site.

It should be noted that the embodiment described herein uses such labels as "site" and "channel" for convenience. Other labels may be used in other embodiments, and it is not necessary that the "site" object correspond to an actual site. It may represent only a portion of a site, or it may be a purely organizational tool.

It can be seen that the structure of each site is very similar in appearance to the structure of the content repository illustrated in FIG. 2. The objects within the site structures, however, are essentially references for targeting the content items owned by the projects of the content repository. For instance, if it would be desirable to target a certain group of content items for a particular site, all of those content items can be placed in a channel within the site structure. The content items can then be targeted using that channel. This may be useful when, for example, this group of content items is updated and it is desired to deploy the updated items.

The objects in the site structures are abstract objects (e.g., database objects) that are used to target content items. Put another way, the objects in the site structures represent the content items, or groups of content items, in the content repository. The content items in the site structure are actually links or shortcuts that are linked to the actual content items which reside in the content repository. The content items can therefore be individually targeted. A channel may contain content items and/or subchannels, and can be used to target all of the content items it contains (including those contained in its subchannels). A site may contain content items and/or channels and/or subchannels, and can be used to target all of the content items it contains (including those contained in its channels and subchannels).

A tree of channels can be used in many different ways. For example, it can be used to organize the content in each page of a site. That is, a channel can be created for each page, and the content objects corresponding to the content in the page can be placed in the associated channel. In another case, a tree of channels can be used as a navigation scheme. In yet another case, it can be used as a classification scheme that is invisible to navigation. Thus, the site/channel structure is a context-specific taxonomy While the structures 200 and 240 of sites 210 and 250 are similar in appearance to the structure of content repository 100, there is not necessarily any correspondence between the folders of the content repository and the channels of the site. The only correspondence is between the abstract content items of the site and the actual content items of the content repository (to which the abstract content items are linked). The structures of the sites and the content repository may be completely different. The structures in the figures are simplified for the purposes of illustration and are merely exemplary.

Another difference between the site and the content repository is that the objects are associated with other objects in the site. In one embodiment, these associations are maintained by references from certain ones of the objects to the other objects with which they are associated. For instance, in one embodiment, a channel contains references to all of the content items that are in the channel. The channel also contains a reference to the site to which it belongs. These references define the objects' positions in the site structure with respect to the other objects.

References to the content item objects may, for example, be contained by the corresponding channels. On the other hand, the content item objects may contain references to the channel or channels with which they are associated. Put another way, the references may be owned by either of the objects although, in a given implementation, it is preferred that the direction of the references should be consistent (e.g., from channels to content items).

Figure 6:
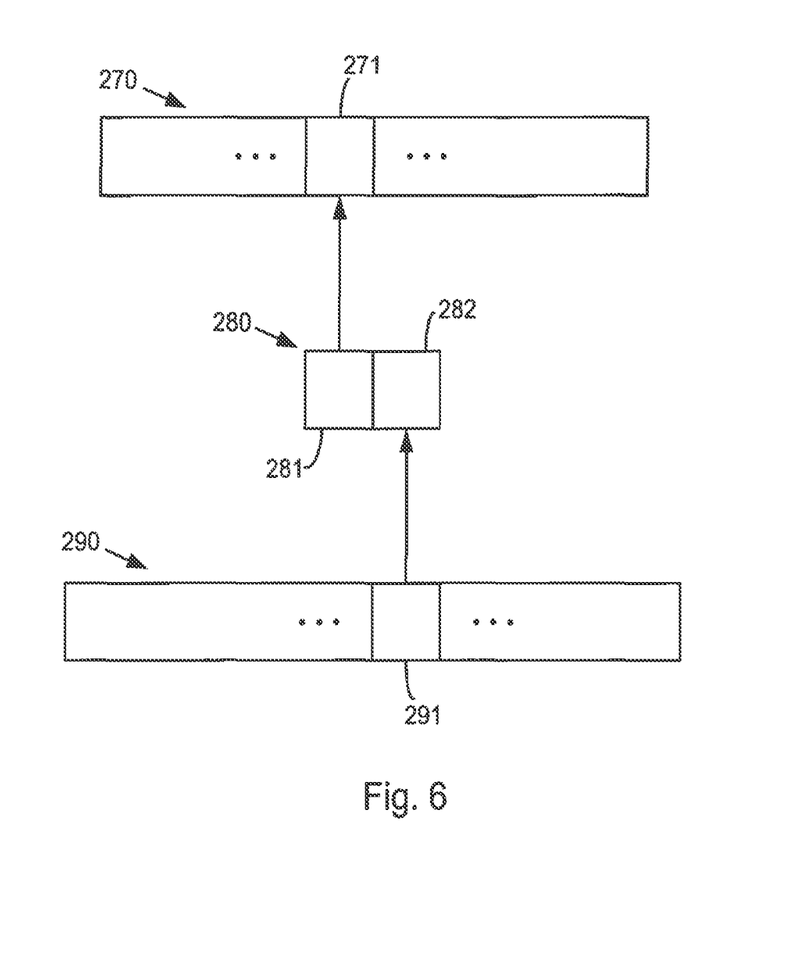
FIG. 6 is a diagram illustrating the manner in which references between channels and content items are maintained in one embodiment using a channel-content item table.

Referring to FIG. 6, a diagram illustrating the manner in which references between channels and content items are maintained in one embodiment is shown. Multiple content item entries are stored in a content item table 270. Multiple channel entries are stored in a channel table 290. In the embodiment depicted in the figure, a single content item entry 271 and a single channel entry 291 are associated with each other through a channel-content item table 280. While content item table 270 and channel table 290 may each contain many entries, channel-content item table 280 only contains two: a single content item entry 281 and a single channel entry 282. Thus, channel-content item table 280 provides a referential link between the respective content item and channel.

As noted above, the reference can be owned by either the channel or the content item. In the embodiment of FIG. 6, the reference (in this case the link provided by channel-content item table) is owned by the content item. One of the benefits of having the content item own the reference is that, if the channel is deployed when the content item has not been authorized for deployment, the content item is not deployed with the channel. If the content item is later authorized, the reference (the link through the channel-content item table) which is owned by the content item is also authorized, and the content item can be pulled into the channel.

The difference between the channels of the site structure and the organization of the content repository may be illustrated by an analogy. A grocery store chain maintains a certain set of goods (content items) that it makes available to its customers. The goods are stored at a distribution center (a content repository). The goods are arranged at the distribution center in a manner that is convenient for the receiving, storage, distribution, etc. of the goods. This may be according to the supplier (e.g., all goods from a particular supplier are grouped together), type (e.g., all refrigerated goods are stored together), or some other set of categories. When the goods are distributed (deployed) to the individual stores (sites) in the chain (the enterprise), they may be arranged on the shelves (channels) in different ways in different stores. While this is simply an analogy, it illustrates the different between the back office or distribution center organization function of the content repository and the front office or store shelf organization function of the site structure's channels.

Figure 7:
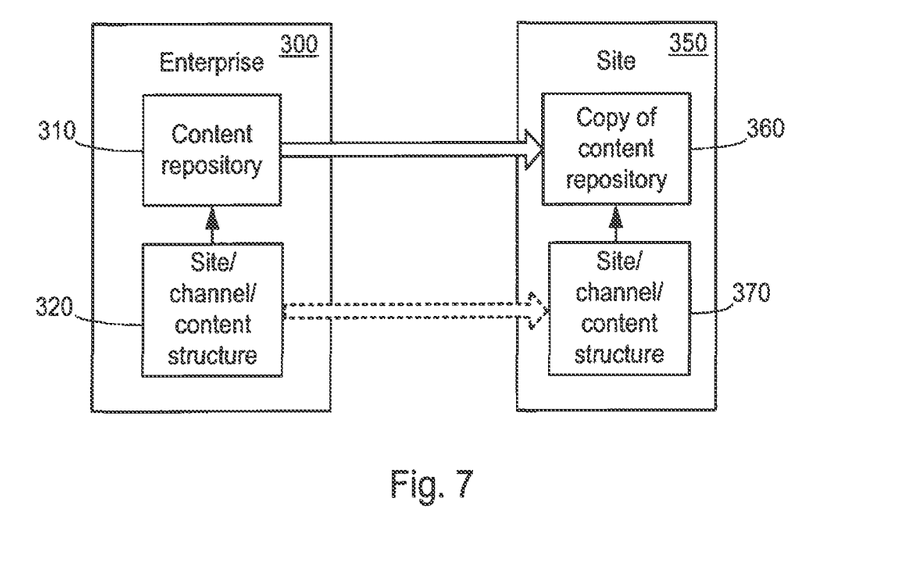
FIG. 7 is a diagram illustrating the incremental deployment of content from the enterprise level to the site level in one embodiment.

The system can provide various advantages in deployment of content. Because the site objects' relative positions in the sites are defined by these references, the site objects can be deployed individually or in groups (e.g., channels and their contents) that comprise only portions of the content repository. Put another way, incremental updates can be made to the site's content rather than wholesale replacement of all the site's content. This is illustrated in FIG. 7. By contrast, the content repository itself cannot be deployed in pieces because the pieces are not associated with each other. Consequently, it would not be known where these pieces fit into the repository or site when deployed. It is therefore necessary in prior art systems to deploy a new copy of the entire content repository as illustrated in FIG. 1.

Referring to FIG. 7, a diagram illustrating the incremental deployment of a portion of a content repository in one embodiment is shown. In this figure, the enterprise and site environments are indicated by the reference numbers 300 and 350, respectively. Enterprise environment 300 includes the content repository 310 in which all of the content for the enterprise is stored, as well as a site structure 320. Site structure 320 may include one or more site objects, channel objects and content objects. Site environment 350 includes a copy 360 of the content repository, as well as the site structure 370 of the specific internet property (i.e., the site itself). It should be noted that site structure 370 typically will not include all of the structure 320 defined at the enterprise level, as this structure will normally incorporate the structures of all the different internet properties owned by the enterprise.

FIG. 7 depicts the referential relationships of enterprise-level site structure 320 to content repository 310 and site-level structure 370 to content repository copy 360 by arrows between them. The dashed arrow from enterprise-level site structure 320 to site-level structure 370 indicates the effective deployment of specific site, channel and/or content objects from the enterprise environment to the site environment (i.e., incremental deployment or updating of the internet property). The solid arrow from content repository 310 to copy 360 indicates the actual movement of data from the enterprise environment to the site environment. It should be noted that the actual data that is transferred from the enterprise level to the site level is less than the entire content repository.

The system also facilitates deployment of content in that the channels serve as a handle for all of the content objects in the channel. Consequently, all of the content objects can be deployed simply by deploying the channel object. Likewise, all of the channels and content objects in a site can be deployed by deploying the site object. Sections of sites, or even entire sites can therefore be predefined and deployed to the appropriate endpoints.

Further advantages relate to the fact that the site objects, channel objects and content objects have content services associated with them. As mentioned above, one customer service is deployment, which also allows individual pieces or portions of the content to be deployed without having to copy the entire content repository. Versioning allows the system to maintain old versions of modified objects. Then, if a modified object does not function as expected, an older version of the object can be restored. This is true not only for content objects, but also for channel objects and site objects. Likewise, any of these objects can be used in the various other content services (e.g., categorizing, business process modeling, etc.) in the same manner as the content objects.

The embodiment described above is directed primarily to an enterprise-level content management application that is configured to maintain one or more site structures, wherein the site structures comprise a group of interrelated site objects, channel objects and content objects, each of which has an associated set of content services. The use of references between the site, channel and content objects in this content management application provides sufficient information to the endpoints (which support the sites) to enable the replacement of specific content with newly received content. Incremental updates of the sites are therefore possible.

Another embodiment of the invention may comprise an architecture for managing internet content. The architecture comprises a set of objects, including content objects that correspond to content items in a content repository and channel objects, wherein references between the channel and content objects define the interrelationship between them. Site objects are also defined and are associated with the channels via references between them. The references between the channel and content objects may be "owned" by either the channel objects or the content objects. The references between the site and channel objects may be "owned" by either the site objects or the channel objects. In both cases, the references should preferably all be owned by one type of object or another. The references are maintained when the objects are deployed, so that the hardware for the receiving site can determine where the objects belong in the structure of the site and can make incremental changes to the site.

In one embodiment, the objects of the architecture are instantiated from classes which inherit the same set of content services from a parent class. These content services may comprise versioning, restoring, deploying, workflow, approval, authorization, archiving, reporting, categorizing, business process modeling, and so on. Because the site and channel classes inherit the same services as the content class, the site and channel objects can be handled in the same manner as the content objects.

Another embodiment of the invention may be a method. One method comprises providing a content repository having a plurality of content items, creating a plurality of abstract content objects, each having an associated set of content services, and linking each of the content objects to a corresponding one of the content items. Then, the content items can be managed using the content services associated with each of them.

Another method comprises providing one or more content objects and one or more channel objects, wherein the content objects are linked to corresponding content items in a content repository, and creating references between the channel objects and content objects. The content can then be managed not only at the content object level, but also at the channel level. The channel objects can be used, for example, to categorize content objects, to organize content objects, as handles for groups of content objects. If the channel objects have the same content services as the content objects associated with them, they can be handled in the same manner as the content objects.

Another method comprises providing one or more content objects and one or more channel objects, wherein the content objects are linked to corresponding content items in a content repository, creating references between the channel objects and content objects, and deploying one or more of the channel and/or content objects to an endpoint. The references between the channel and content objects may be owned by either the channel objects or the content objects. The reference data is deployed with the objects and provides sufficient information to enable the replacement of obsolete versions of the objects with the newer versions of the objects (i.e., incremental updating of the content at the endpoint).

Another embodiment of the invention may be a software application. The software application includes instructions for causing a computer or other data processor to perform the methods disclosed herein and to implement the architecture described herein. These software applications may be embodied in any medium readable by such a computer or data processor, including floppy disks, magnetic tapes, CD-ROMs, DVD-ROMs, RAM, ROM, and the like. Likewise, a computer or data processor which is configured to execute such software applications, or which is otherwise programmed to perform the methods disclosed herein is intended to be covered by the present application. It should be noted that the methodologies disclosed herein may also be implemented in various combinations of software (including firmware) and hardware. The present application is intended to cover such combinations.

The benefits and advantages which may be provided by the invention have been described above with regard to specific embodiments. These benefits and advantages, and any elements or limitations that may cause them to occur or to become more pronounced are not to be construed as critical, required, or essential features of any or all of the claims. As used herein, the terms 'comprises,' 'comprising,' or any other variations thereof, are intended to be interpreted as non-exclusively including the elements or limitations which follow those terms. Accordingly, a process, method, article, or apparatus that comprises a list of elements does not include only those elements but may include other elements not expressly listed or inherent to the claimed process, method, article, or apparatus.

While the invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A method for content management implemented in a computer including at least one processor and at least one non-transitory computer readable medium storing instructions translatable by the at least one processor, the method comprising:

instantiating one or more content objects from a class, wherein the one or more content objects inherit a set of content services from a parent class;

linking the one or more content objects to a content item residing in a content repository by providing each of the one or more content objects with a corresponding shortcut that references the content item in the content repository; and managing the one or more content objects for multiple sites using the set of content services over a network, each of the multiple sites associated with a respective plurality of content objects specifying at least a portion of site content for the each site, the managing including:

individually deploying each of the one or more content objects via the network from the computer to a corresponding endpoint device which is coupled to the computer by the network, the endpoint device supporting a corresponding site of the multiple sites, while the corresponding linked content item is retained in the content repository, and is not deployed with the individually deployed one or more content objects, and executing one or more of the content services of the deployed content objects, the executing one or more of the content services including accessing the corresponding linked undeployed content item over the network via the shortcuts between the deployed content objects and the corresponding linked undeployed content item in the content repository, and the executing one or more of the content services including updating the one or more content objects based on the corresponding linked undeployed content item in the content repository.

2. The method according to claim 1, further comprising:
deploying reference data with the content object from the computer to the endpoint device, the reference data containing information for replacement of a version of the content object at the endpoint device.

3. The method according to claim 1, further comprising:
creating a reference between the content object and a channel object, wherein the channel object is instantiated from a class which inherits the set of content services from the parent class, and wherein the reference is owned by the content object or the channel object.

4. The method according to claim 3, wherein the content item is managed using the set of content services via the content object or the channel object, or a combination thereof.

5. The method according to claim 3, further comprising:
deploying the channel object from the computer to the endpoint device in addition to or instead of deploying the content object from the computer to the endpoint device.

6. The method according to claim 1, wherein the endpoint device is capable of:
determining where the content object belong in a structure of the site; and
making one or more incremental changes to the site using the content object received from the computer over the network.

7. The method according to claim 1, wherein the set of content services comprises at least one of versioning, restoring, deploying, workflow, approval, authorization, archiving, reporting, categorizing, or business process modeling.

8. A computer program product comprising at least one non-transitory computer readable medium storing instructions translatable by a computer having at least one processor and at least one non-transitory computer readable medium storing instructions translatable by the at least one processor to perform:

instantiating one or more content objects from a class, wherein the one or more content objects inherit a set of content services from a parent class;

linking the one or more content objects to a content item residing in a content repository by providing each of the one or more content objects with a corresponding shortcut that references the content item in the content repository; and managing the one or more content objects for multiple sites using the set of content services over a network, each of the multiple sites associated with a respective plurality of content objects specifying at least a portion of site content for the each site, the managing including:

individually deploying each of the one or more content objects via the network from the computer to a corresponding endpoint device which is coupled to the computer by the network, the endpoint device supporting a corresponding site of the multiple sites, while the corresponding linked content item is retained in the content repository, and is not deployed with the individually deployed one or more content objects, and executing one or more of the content services of the deployed content objects, the executing one or more of the content services including accessing the corresponding linked undeployed content item over the network via the shortcuts between the deployed content objects and the corresponding linked undeployed content item in the content repository, and the executing one or more of the content services including updating the one or more content objects based on the corresponding linked undeployed content item in the content repository.

9. The computer program product of claim 8, wherein the at least one non-transitory computer readable medium stores further instructions translatable by the computer to perform:
deploying reference data with the content object to the endpoint device, the reference data containing information for replacement of a version of the content object at the endpoint device.

10. The computer program product of claim 8, wherein the at least one non-transitory computer readable medium stores further instructions translatable by the computer to perform:
creating a reference between the content object and a channel object, wherein the channel object is instantiated from a class which inherits the set of content services from the parent class, and wherein the reference is owned by the content object or the channel object.

11. The computer program product of claim 10, wherein the content item is managed using the set of content services via the content object or the channel object, or a combination thereof.

12. The computer program product of claim 10, wherein the at least one non-transitory computer readable medium stores further instructions translatable by the computer to perform:

deploying the channel object to the endpoint device in addition to or instead of deploying the content object to the endpoint device.

13. The computer program product of claim 8, wherein the set of content services comprises at least one of versioning, restoring, deploying, workflow, approval, authorization, archiving, reporting, categorizing, or business process modeling.

14. A system for content management, comprising:

at least one processor; and at least one non-transitory computer readable medium storing instructions translatable by the at least one processor to perform:

instantiating one or more content objects from a class, wherein the one or more content objects inherit a set of content services from a parent class;

linking the one or more content objects to a content item residing in a content repository by providing each of the one or more content objects with a corresponding shortcut that references the content item in the content repository; and managing the one or more content objects for multiple sites using the set of content services over a network, each of the multiple sites associated with a respective plurality of content objects specifying at least a portion of site content for the each site, the managing including:

individually deploying each of the one or more content objects via the network from the computer to a corresponding endpoint device which is coupled to the computer by the network, the endpoint device supporting a corresponding site of the multiple sites, while the corresponding linked content item is retained in the content repository, and is not deployed with the individually deployed one or more content objects, and executing one or more of the content services of the deployed content objects, the executing one or more of the content services including accessing the corresponding linked undeployed content item over the network via the shortcuts between the deployed content objects and the corresponding linked undeployed content item in the content repository, and the executing one or more of the content services including updating the one or more content objects based on the corresponding linked undeployed content item in the content repository.

15. The system of claim 14, wherein the at least one non-transitory computer readable medium stores further instructions translatable by the at least one processor to perform:

deploying reference data with the content object to the endpoint device, the reference data containing information for replacement of a version of the content object at the endpoint device.

16. The system of claim 14, wherein the at least one non-transitory computer readable medium stores further instructions translatable by the at least one processor to perform:

creating a reference between the content object and a channel object, wherein the channel object is instantiated from a class which inherits the set of content services from the parent class, and wherein the reference is owned by the content object or the channel object.

17. The system of claim 16, wherein the content item is managed using the set of content services via the content object or the channel object, or a combination thereof.

18. The system of claim 16, wherein the at least one non-transitory computer readable medium stores further instructions translatable by the at least one processor to perform:

deploying the channel object to the endpoint device in addition to or instead of deploying the content object to the endpoint device.

19. The system of claim 14, wherein the endpoint device is capable of:

determining where the content object belong in a structure of the site; and making one or more incremental changes to the site using the content object received from the computer over the network.

20. The system of claim 14, wherein the set of content services comprises at least one of versioning, restoring, deploying, workflow, approval, authorization, archiving, reporting, categorizing, or business process modeling.

* * * * *